March 29, 1966   J. H. DEPPELER, JR., ETAL   3,242,538
ART OF MOLD WELDING
Filed May 24, 1962   3 Sheets-Sheet 3
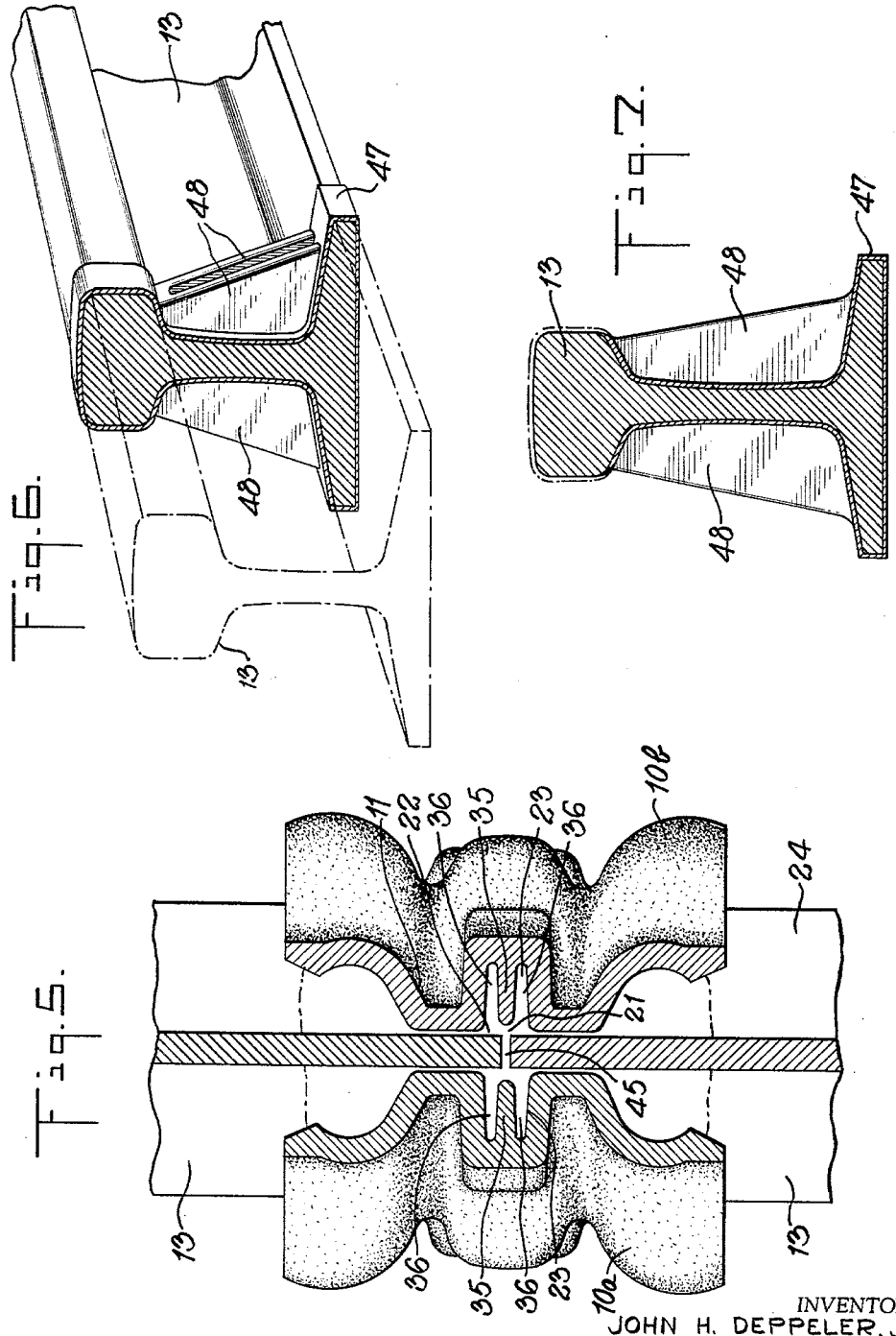
INVENTORS
JOHN H. DEPPELER, JR.
EDMUND J. ANTCZAK
BY
Burgess, Ryan & Treks
ATTORNEYS

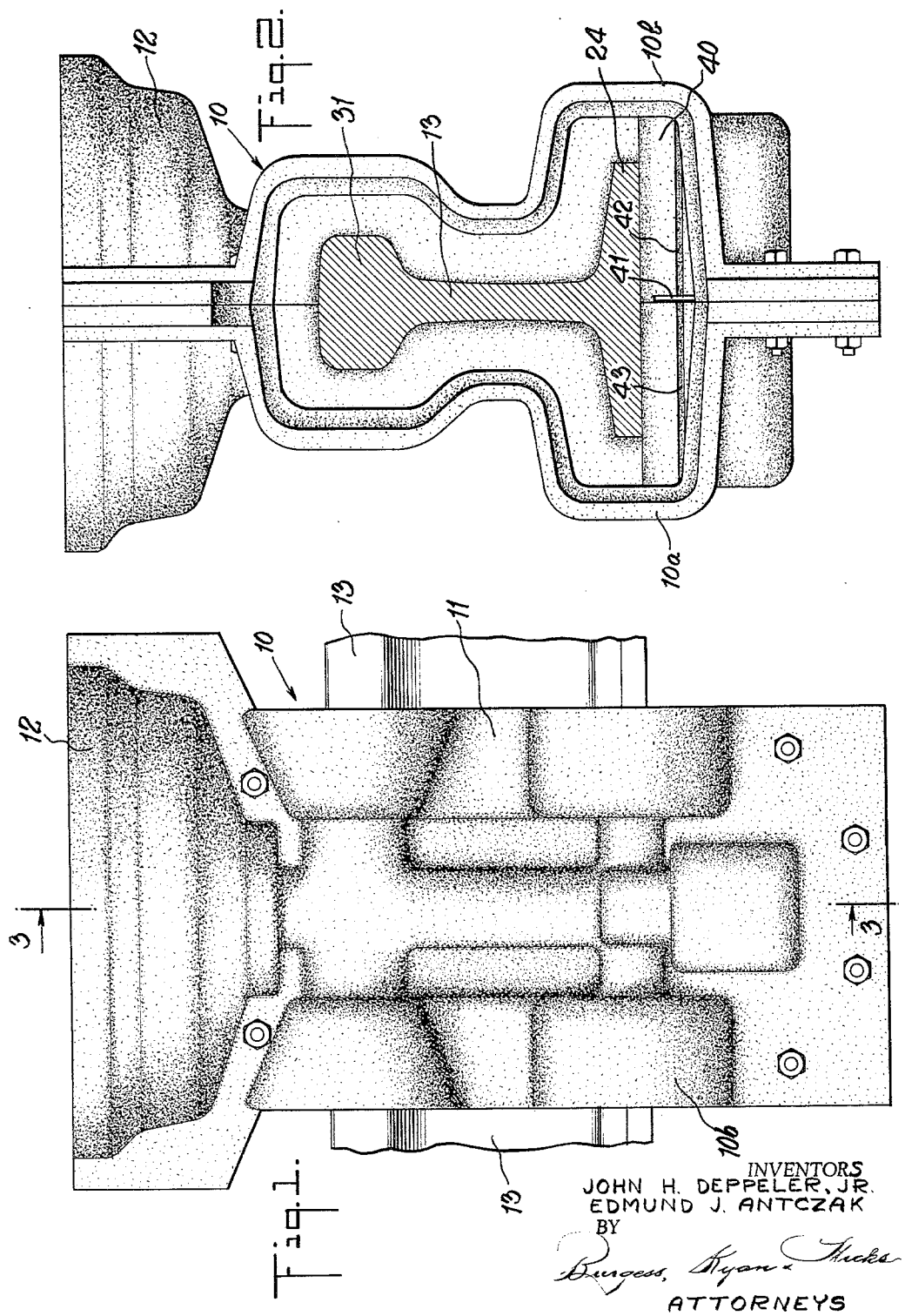

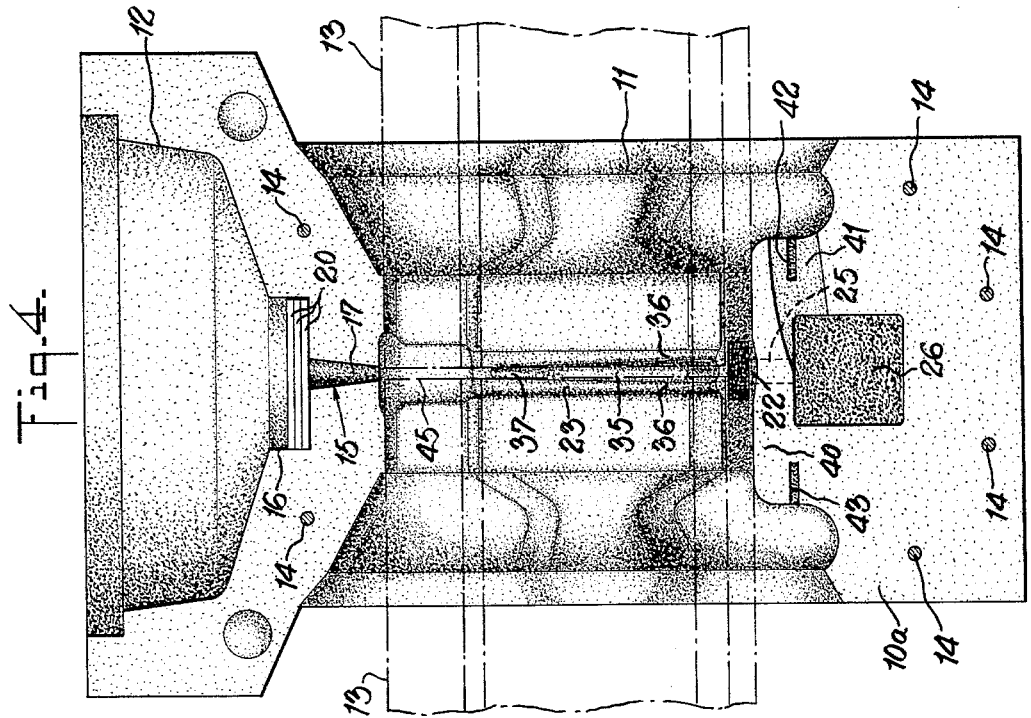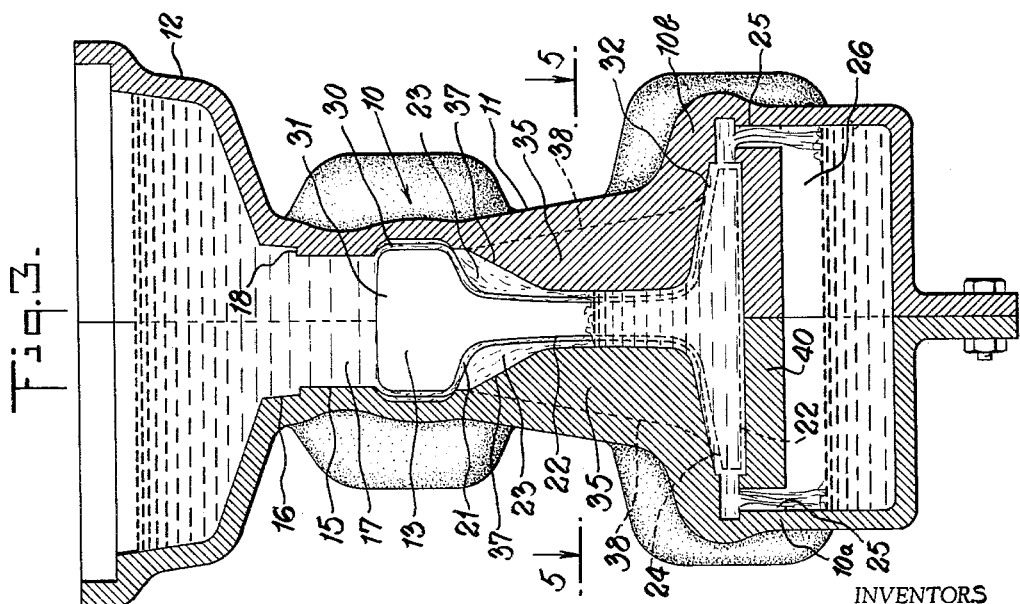

United States Patent Office 3,242,538
Patented Mar. 29, 1966

3,242,538
ART OF MOLD WELDING
John H. Deppeler, Jr., Brielle, and Edmund J. Antczak,
Red Bank, N.J., assignors to Thermex Metallurgical,
Inc., Lakehurst, N.J., a corporation of New Jersey
Filed May 24, 1962, Ser. No. 197,511
The portion of the term of the patent subsequent to
June 4, 1980, has been dedicated to the Public
8 Claims. (Cl. 22—124)

The present invention relates to the art of mold welding.

In the commercial alumino-thermic process of welding metal parts together, such as T-rails, the parts are aligned end to end, a mold is placed around these parts in the region of the weld to be formed, a charge of alumino-thermic mixture is ignited in a crucible located above the mold and the crucible is tapped at the right time to deliver superheated molten metal to the mold. A fusible tap control disc or a number of these discs may be employed in the tap hole of the crucible as a plug to prevent the alumino-thermic mixture after it has become ignited and fused, from discharging before the metal has had time to become completely melted and superheated and the alumino-thermic slag to completely form and collect at the top. At the proper time, the metal disc or discs melts and the crucible is automatically tapped.

Preheating of the mold cavity is a prerequisite to the forming of a proper weld and in copending application Serial No. 18,336 filed March 29, 1960, now U.S. Patent No. 3,091,825, there is disclosed and claimed a mold constructed to eliminate the use of special combustion or preheating chambers requiring special heating mediums, such as hot gases or torch flames. In accordance with the invention disclosed in the aforesaid application, the mold is provided with a sump or discharge chamber or chambers located just beyond the lowermost part of the mold cavity and connected thereto by an exit gate or gates. The pouring or entrance gate is desirably larger than the exit gate or gates in cross-sectional area, so that part of the molten metal which streams through the gap between the confronting faces of the metal parts being welded and which preheats these faces, flows into the discharge chamber or chambers, while the remainder of the metal forms a liquid bath between these faces. By discharging some of the metal from the mold cavity, a greater amount of the superheated metal for preheating is made to flow across the confronting faces of the parts being welded together. The extent of this preheating depends on the relative sizes of the entrance and exit gates in cross-sectional area, the size of the sump or discharge chamber and other factors to be made apparent hereinafter.

It is important with the process and means described to effect transfer of heat from the molten metal to the metal parts to be welded together during the preheating stage as rapidly and as efficiently as possible, to reduce the amount of alumino-thermic mixture required to make an effective weld.

One object of the present invention is to provide a new and improved mold welding process and means by which the necessity of special preheating mediums, such as hot gases or torch flames are avoided and by which better and more efficient transfer of heat from the molten weld metal to the parent metal is effected, whereby the amount of alumino-thermic mixture required to preheat and form a sound weld is materially reduced.

In welding parts together, such as T-rails, the most difficult sections to preheat properly are the bases of these parts. To attain the aforesaid object of the present invention, the mold formed of two similar halves or sections is provided with a sump or discharge chamber or chambers located just beyond the lowermost part of the mold cavity and connected to the mold cavity by an exit gate or gates, and the pouring or entrance gate is desirably not smaller than the exit gate or gates to assure a metal bath in the mold cavity on which the new metal falls before the sump or discharge chamber is filled, so that agitation and turbulence is created in said metal bath promoting efficient heat transfer between the molten metal in said mold cavity and the metal parts to be welded together. In addition, along the side of each mold section is a recess designed to conduct the molten metal from near the entrance gate directly onto the bases of the metal parts to be welded together for direct impingement thereon. As a result of this construction, a portion of the molten metal discharged into the mold cavity passes between and sweeps across the cold confronting ends of the metal parts to be welded together, and a substantial portion of this molten metal impinges directly onto the bases of these metal parts, so that these metal base parts are quickly and efficiently preheated by the molten metal. Some of the molten metal in the initial preheating stage is discharged into the sump or discharge chamber or chambers, and as a result, a greater amount of the superheated metal for preheating is made to flow across the confronting faces and impingedly onto the bases of the metal parts to be welded together, the extent of this metal used solely for preheating and not forming a part of the welding depending on the size of the sump.

Because of the direct impingement of the molten metal onto the bases of the metal parts to be welded together, there is a more efficient transfer of heat to these bases than would be the case if the molten metal merely flowed along or across the end faces of the bases. Heat transfer is not only more efficiently promoted by direct impingement, but this impingement creates a great deal of turbulence in the molten metal in the region of the bases and this serves to increase still more the efficiency of heat transfer. Because of the greater efficiency in heat transfer in the base regions of the metal parts to be welded together, it is possible to produce an efficient weld between two metal parts to be welded with substantially less alumino-thermic mixture than is required where no direct impingement of the molten metal is involved.

During the pouring of the molten metal into the mold cavity and into the sump or discharge chamber or chambers described, the air therein is forced out through porous walls of the mold and through the sealing or luting materials employed between the mold and the parts to be welded to prevent leakage. Because of the great pressures created by the forcing of the air through the walls of the mold, the mold must be constructed with walls thick enough to withstand this pressure.

Another object of the present invention is to provide a new and improved mold constructed with vent means designed to permit the air or other gases in the mold to escape easily and more evenly from the mold cavity and from the sump or discharge chamber or chambers, thereby permitting the use of a mold with thinner walls and consequently reducing the weight and cost of the mold. By venting, you prevent the metal from breaking through the mold wall or through the sealing material as a result of the high pressures developed.

In carrying out the latter object of the invention, each half or section of the mold has a hollow defining half of the discharge chamber formed when the two mold sections are placed together, and a recess extending from the upper part of the hollow across the face of the mold section to one end of the mold section. Extending across the end of the mold section where the face recess terminates is a recess in communication with said face recess. The two mold sections are interchangeably constructed, so that during mold welding, the air and any gases produced are discharged from the sump or discharge chamber along the two face recesses to opposite ends of the mold, and then along the two opposite end recesses. From the end recesses, the air and gases are discharged through the porous masses closing and sealing the ends of the mold.

Various other objects, features and advantages of the invention are apparent from the following description and from the accompanying drawings, in which—

FIG. 1 is a side view of a two-part alumino-thermic mold welding assembly embodying the present invention and shown applied to the welding of T-rail parts together;

FIG. 2 is an end view of the alumino-thermic mold welding assembly shown in FIG. 1;

FIG. 3 is a section of the mold welding assembly taken on lines 3—3 of FIG. 1, but shown after the crucible has been tapped and before the mold cavity has been filled up;

FIG. 4 is an inside face view of one half or section of the mold welding assembly of FIG. 1, but shown with the two rail parts to be welded together set up end to end for welding, and shown in dot and dash lines;

FIG. 5 is a section of the mold welding assembly taken on lines 5—5 of FIG. 3;

FIG. 6 is a perspective of the T-rail after welding, the end of the rail being shown as a section taken through the middle of the weld region; and FIG. 7 is a transverse section of the weld T-rail in the region of the weld.

Referring to the drawings, the welding unit 10 comprises a mold 11 and a crucible 12, designed to weld together T-rail parts 13. The welding unit 10 is of the shell porous type, made for example, of sand bonded together by a resin, such as phenol-formaldehyde, and is expendable.

The welding unit 10 is of the split form comprising two duplicate interchangeable sections 10a and 10b, each made of one piece. These welding unit sections 10a and 10b are adapted to be bolted together into face to face contact through holes 14 or joined together by clamps, and when assembled, conjointly define the lower mold 11 and the upper crucible 12 for the alumino-thermic mixture. The crucible 12 has an outlet 15 in the form of a neck, circularly at its upper section 16 and of reduced rectangular cross-section at its lower section 17 to form a shoulder 18 serving as a seat for one or more circular tap control discs 20 (three being shown), adapted to fit in said upper outlet section 16. The lower section 17 of the crucible outlet serves not only as the tap hole for the crucible 12, but also is the entrance gate for the mold 11, so that the stream of metal drawn from the crucible is not exposed to the atmosphere before entering the mold. This obviates heat losses in the tapped metal from radiation or conduction to the atmosphere.

The welding unit sections 10a and 10b also conjointly define a mold cavity 21 for receiving in end to end alignment and in spaced relationship the sections of the rail parts 13 to be welded together. This mold cavity 21 conforms in outline to the contour of the rail parts 13 to be welded together except for a space 22 around the perimeter of said cavity, just sufficiently deep and sufficiently wide to form a thin band in the region of the junction between said parts assuring a good solid weld therebetween, and except for recesses 23, which are located in the walls of the welding unit sections 10a and 10b forming the side walls of said mold cavity and which extend along said walls for conducting the molten metal directly onto the top of the bases 24 of the rail parts 13, as will be described more fully hereinafter. In the case of a rail bond, the mold cavity 21 will have a T-shape cross-section conforming close to that of the rail parts 13 to be welded, except for the small clearance 22 around the sides and bottom of the rail parts in the order of about 1/8″ deep and except for the recesses 23 to be described.

Communicating with the mold cavity 21 through bottom exit gates 25 is a sump or discharge chamber 26 formed by the assembled welding unit sections 10a and 10b. This chamber 26 is shown below the exit gates 25, but may be deposed above the exit gates as long as it is located in position to cause the discharge from the mold cavity 21 to flow therein by gravity or by hydrostatic head, and is closed, whereby when said discharge chamber is filled with preheating metal, said metal in said discharge chamber automatically stops flow through said exit gates.

Two exit gates 25 are shown at opposite sides of the bottom of the mold cavity 21 to assure the flow of molten metal across substantially the entire areas of the confronting end faces of the rail parts 13 before the metal is discharged through these gates into the sump or discharge chamber 26. The total cross-sectional area of these exit gates 25 is shown smaller than the cross-sectional area of the tap hole or entrance gate 17 to permit the molten metal to flow into the mold cavity 21 at a greater rate than it is discharged therefrom through the exit gates 25 and to permit thereby the metal bath formed in the mold cavity 21 to rise. The dimensions of the rail parts 13 to be welded together and their shape determine to some extent the relative cross-sectional areas of the entrance gate 17 and the exit gates 25, and thereby the rate of rise of the metal bath in the mold cavity 21. It is desirable, however, that the total cross-sectional area of the exit gates 25 be no greater than the cross-sectional area of the entrance gate 17, to assure in the mold cavity 21, at least early during the pouring period, a metal bath on the surface of which the new metal falls, and to effect thereby a turbulence on said surface promoting the efficiency of heat transfer from the molten metal in the mold cavity to the metal parts to be welded together. If, for example, it is desired to weld together metal parts having regions near the bottom of the mold cavity difficult to weld, such as a rail base, it may be advisable to have the metal bath rise slowly during the early period of the pour so that turbulence is maintained at the lower level of the mold cavity for a prolonged period until the sump or discharge chamber 26 fills up. In order to accomplish this, the total cross-sectional area of the exit gates 25 is almost as large, or may even be as large as the cross-sectional area of the entrance gate 17, to maintain the level of the metal bath low in the mold cavity near the level of the rail base, until such time as the sump or discharge chamber 26 has completely filled up, whereupon flow through the exit gates 25 in said sump or chamber is automatically shut off and the level of the metal bath in the mold cavity will rise comparatively rapidly to complete the pour.

Conversely, if the metal parts in the low regions of the mold cavity were the ones that were easy to weld, it might be desirable to have the total cross-sectional area of the exit gates 25 so much smaller than the cross-sectional area of the entrance gate 17, that the level of the metal bath in the mold cavity and, therefore, the level of the turbulence on the surface of the metal bath would come up to regions of the metal parts near the top of the mold cavity much quicker.

The sump or discharge chamber 26 is at least large enough to be completely filled at the end of the period of pour. Therefore, the size of the sump or discharge chamber 26 depends on the amount of preheaing metal required. How efficiently that preheating metal is used is determined by the flow paths in the mold cavity 21 and by the rate of rise of the metal bath in said cavity, which in turn is determined by the relative cross-sectional areas of the entrance gate 17 and the exit gates 25.

As an important feature of the present invention, in order to cause the molten metal to transfer its heat more quickly and more completely to the rail parts 13 to be welded together, there is provided in each welding unit section 10a or 10b, a recess 23, extending downwardly from the head part 30 of the mold cavity 21 in which the heads 31 of the rail parts 13 to be welded together are received for welding to the base part 32 of the mold cavity in which the bases 24 of the rail parts are received. This recess 23 extends at its lower discharge end laterally beyond the gap 45 between the rail parts 13, so that the discharge from the recess impinges directly on the top of the bases 24 of these rail parts and flares downwardly in depth as shown in FIG. 3, so that at its upper end, it desirably does not extend outwardly beyond the head part 30 of the mold cavity 21 and at the lower end, it extends to a region near the outer end of the base part 32 of the mold cavity.

In order to direct the molten metal into two well defined streams onto the two bases 24 respectively of the rail parts 13 in the base part 32 of the mold cavity 21, the recess 23 is divided by a wall 35 in the center thereof partitioning the recess into two adjoining channels 36 for conducting the molten metal directly onto the tops of the bases 24 of the rail parts 13, so that the streams discharged from said channels impinge directly on the tops of said bases 24. The recess 23 is of substantially uniform width, but the width or thickness of the dividing wall 35 progressively increases downwardly as shown in FIG. 4, so that the channels 36 formed by this dividing wall taper downwardly. Also, the upper edge 37 of this wall 35 slants upwardly and outwardly from the mold cavity 21 and terminates at the back 38 of the recess at a short distance below the top of the recess to form in the upper section of the recess a reservoir for the channels 36. Also, with the construction described, the upper section of each channel 36 serves as a funnel assuring full constant feed of molten metal to the lower section of smaller cross-section for impingement upon the bases 24 of the corresponding rail parts 13.

In the process of welding two rail parts 13 together, the two rail parts are placed in end to end alignment and sufficiently close together, so that when the welding unit sections 10a and 10b are placed around these rail parts in proper position for welding, the bases 24 of the two rail parts 13 at the ends of said rail parts are directly underneath the two channels 36 respectively of each welding unit section 10a or 10b. With this arrangement, the molten metal will not only flow between the confronting faces of the ends of the rail parts 13, but will flow through the channels 36 and impinge directly onto the top of the bases 24 of the rail parts, thereby transferring heat quickly and effectively from the molten metal to the rail parts and preheating these parts efficiently. Since the lower ends of the channels 36 extend almost across the full width of the bases 24 of the rail parts 13, direct impingement of the molten metal on the bases is effective almost across this full width, thereby assuring a most effective heat transfer in a minimum of time and with a minimum of molten metal. The amount of alumino-thermic mixture required to produce an effective weld with the improved construction described is thereby materially reduced, so that the cost of welding operation is correspondingly reduced.

In order to decrease still further the cost of welding operation, the welding unit 10 is so constructed as to require a minimum of material in its construction. For that purpose, instead of depending entirely on the porosity of the walls of the welding unit 10 to vent the air or other gases in the mold cavity 21 and the sump or discharge chamber 26 as a molten metal flows in said unit, and thereby making it necessary to provide a welding unit with walls of substantial thickness to withstand the resulting pressures created, well-defined passage means are provided which permit easy and efficient venting of the welding unit.

In the specific form of the invention shown, each welding unit sections 10a or 10b has a bottom wall 40 defining one half of the bottom of the mold cavity 21 and has a shallow recess 41 on the inner face of said wall where the two welding unit sections come face to face in assembled connected position, extending from an upper corner of the hollow forming one half of the sump or discharge chamber 26 to the end of the welding unit section. At this end of the welding unit section 10a or 10b, the welding unit section has in its bottom wall 40 a deep recess 42 extending across substantially the full width of the bottom wall 40 and communicating with the face recess 41. The opposite end of the welding unit section 10a or 10b has in its bottom wall 40 a similar deep recess 43, which when the two similar interchangeable welding unit sections 10a and 10b are assembled face to face for welding operations, joins the end recess 42 in the other welding unit section. With this construction, the two deep recesses 42 and 43 of the two welding unit sections 10a and 10b at each end of the unit 10 are joined end to end to form a vent passage extending substantially across the full width of the unit joined to one side of the discharge chamber 26 by the shallow face recess 41.

In assembled position of the welding unit sections 10a and 10b around the rail parts 13 to be welded together, the recesses 41 in the confronting faces of these welding unit sections respectively serving as vent passages, extend from the upper opposite sides of the sump or discharge chamber 26 to the opposite ends of the welding unit sections where they lead into the end recesses 42 and 43. The ends of the assembled welding unit 10 are closed and sealed with highly porous material, such as a mixture of sand, clay and water, so that the air and other gases in the mold are distributed widely through the venting system described and made to escape from the recesses 42 and 43 through this sealing material. Because of the manner in which the venting of the mold during metal pouring operations is eased and distributed, no great gas pressures are created, so that the mold walls need not be made thick enough to withstand these great pressures. As a result, the mold walls may be made thinner, thereby reducing the weight of the welding unit 10 and consequently its cost.

In carrying out the process of the present invention, the two rail parts 13 to be welded together are arranged so that they will be in alignment end to end and separated by a gap 45. In the case of conventional T-rail parts 13, the gap may be in the order of ¼ to ½″.

The welding unit sections 10a and 10b are brought together around the rail parts 13 to be welded, so that the gap 45 between the end confronting faces of these parts is located in alignment with the walls 35 centrally dividing the recesses 23. The width of the recesses is such that the ends of the bases 24 of the T-rail parts 13 project underneath said recesses, so that at least a substantial part of the molten metal flowing through the channels 36 formed from said recesses will impinge the upper surfaces of said bases.

After the welding unit sections 10a and 10b have been brought together around the T-rail parts 13 to be welded as described and secured by bolting or otherwise, the ends of the unit sections are closed with sealing material. The tap control discs 20 are then placed on the seat 18 of the crucible outlet 15 and the charge of alumino-thermic material is placed in the crucible 12. The discs 20 are desirably made of a metal according to the tapping time required and in the case wherein the parts 13 to be welded together are rails, the discs are of steel. Each of these discs 20 may be in the order of around 1/16″ thick and the number thereon corresponds to the desired tapping time. The number of these tap control discs 20 should be sufficient to assure enough delay before tapping to permit the alumino-thermic reduction to be substantially completed, any metallic additives present to be completely melted and the alumino-slag to be completely collected on top. If desired, a single disc of the required thickness may be employed.

The alumino-thermic charge in the crucible 12 consisting essentially of metal oxide and aluminum is ignited in the well known manner in the art to produce metal and aluminum oxide, and the exothermic heat created by this reaction melts and superheats the metal and at the right time melts the entire stack of tap control discs 20. In the case where T-rails are to be welded, the metal oxide in the alumino-thermic charge would be essentially iron oxide and the charge would contain the necessary alloying metals and/or other additives to form steel.

The melting of the tap control discs 20 will cause the discharge of the molten metal through the tap hole 17 and into the mold cavity 21.

Since the boundaries of the mold cavity 21 follow conformably close to the contours of the rail parts 13 to be welded except for the space 22 and the reecces 23, a substantial portion of the tapped molten metal will pass through the gap 45 and between the cold confronting end faces of the rail parts 13, thereby preheating said end faces and consequently the end regions of said parts in the vicinity of said faces. In addition, a substantial portion of the tap molten metal will pass through the channels 36 and impinge directly onto the top of the bases 24 of the T-rail parts 13, thereby preheating the bases most effectively. The molten metal sweeping across the confronting faces of the rail parts 13 and impinging onto the bases 24 of these rail parts eventually reaches the exit gates 25 and discharges into the sump or discharge chamber 26. Since the molten metal is delivered to the mold cavity 21 through the entrance gate or tap hole 17 at a greater rate than it is discharged through the exit gates 25 into sump or discharge chamber 26, the metal will accumulate in mold cavity 21 to form a metal bath therein, and the surface of the bath will rise at a rate slower than would be possible in the absence of the exit gates, thereby affording sufficient time to properly preheat the adjoining end sections of the rail parts 13. The relative cross-sectional areas of the entrance and exit gates 17 and 25 depend on the desired rate of rise of the metal bath surface in the mold cavity 21.

As the stream of molten metal strikes the rising surface of the metal bath, it creases turbulence in said surface, and this is helpful in promoting heat transfer to the rail parts 13 and in transmitting heat from the interior of the bath to the ends of said rail parts.

The metal fuses the end sections of the rail parts 13 to form a homogeneous weld with and between these parts and also fills up in the space 22 to form a wrapping band 47 around the weld area, only thin enough to assure a good solid weld between these parts. In addition, the metal solidified in the mold channels 36 forms fins 48 on the weld which may be left on the weld. Although these fins 48 represent added alumino-thermic mixture employed in forming the weld, the saving in alumino-thermic mixture due to the more efficient heat transfer resulting from direct impingement of the molten metal onto the bases 24 of the rail parts 13 more than offsets this added alumino-thermic mixture, so that the total amount of alumino-thermic mixture to make a good weld with the construction and process of the present invention is materially reduced.

As the molten metal is being poured into the mold cavity 21, some of the air and other gases in the mold cavity are forced into the sump or discharge chamber 26 and escape therefrom through the recesses 41 to the opposite ends of the welding unit 10 and then into the deep recesses 42 and 43 at opposite ends of this unit. From these recesses 42 and 43, the air and other gases escape through the porous material closing and sealing the ends of the welding unit 10. With the air and gases vented so easily from the welding unit, no destructive gas pressures are created, so that a successful weld is assured. Also by means of this venting, the welding unit need not be as heavy as in the cases where venting is accomplished slowly solely through the porous walls of the unit.

While the invention has been described with particular reference to a specific embodiment, it is to be understood that it is not to be limited thereto but is to be construed broadly and restricted solely by the scope of the appended claims.

What is claimed is:

1. The process of mold welding two metal parts together having respective base sections, which comprises enclosing the end sections of said metal parts in aligned end to end relation in a mold having an entrance gate, flowing molten metal through said entrance gate, into said mold, and out of said mold at rates so related as to cause some of the metal admitted into the mold to be discharged from said mold while the rest of the molten metal accumulates as a metal bath to cause the molten metal during the early stage of its admission into the mold to preheat the metal parts, and conducting some of said molten metal during said early stage from the entrance gate through a recess and directly onto said base sections in direct impingement with said base sections to promote better heat transfer between said molten metal and said metal parts.

2. A mold for welding two metal parts together having side walls defining a mold cavity for enclosing therein the confronting end sections of said metal parts in aligned end to end relationship, and defining also a recess constituting an extension of said mold cavity, said mold having an entrance gate for the molten metal leading into the upper part of said mold cavity, said recess extending from a region near the upper part of said mold cavity, along said mold cavity and to a region near the lower part of the mold cavity where said recess discharges and extending at its lower discharge end to a region which is located beyond the region where the end sections of the metal parts confront and which is opposite a region of said metal parts in the direct impinging path of the molten metal discharged from said recess, whereby heat transfer between said molten metal and the impinged region of said metal parts is promoted.

3. A mold for welding two metal parts together having respective bases, said mold having side walls defining a mold cavity for enclosing therein the confronting end sections of said metal parts in aligned end to end relationship, said mold having entrance gate means for the molten metal leading into the upper part of said mold cavity, exit gate means near the lower part of said mold cavity and discharge chamber means on the discharge side of said exit gate means, said entrance gate means and said exit gate means being relatively dimensioned to cause flow through said entrance gate means at a greater rate than discharge through said exit gate means, said side walls also defining a recess constituting an extension of said mold cavity and extending from a region near the upper part of said mold cavity, along said mold cavity and to a region near the lower part of the mold cavity where said recess discharges, said recess extending at its lower discharge end to a region which is located beyond the region where the end sections of the metal parts confront and which is opposite a region of a base of one of said metal parts in the direct impinging path of the molten metal discharged from said recess, whereby heat transfer between said molten metal and the impinged base region of said metal part is promoted.

4. A mold for welding two T-rail parts together having respective bases, said mold having side walls flanking the sides of said end sections and defining a mold cavity for enclosing therein the confronting end sections of said rail parts in aligned end to end relationship, said mold having entrance gate means for the molten metal leading into the upper part of said mold and exit gate means for the molten metal near the lower parts of said mold cavity, said side walls having respective recesses constituting extensions of said mold cavity and extending from respective regions near the upper parts of said mold cavity, along opposite sides of said mold cavity and to regions near the lower parts of the mold cavity where said recesses discharge, said recesses extending at their lower discharge ends to regions which are located beyond the regions where the end sections of the rail parts confront and which are directly above the bases of said rail parts in the direct impinging paths of the molten metal discharged from said recesses, whereby heat transfer between said molten metal and the impinged base regions of said metal parts is promoted.

5. A mold as described in claim 3, wherein said recess has a wall therein extending from a region spaced from the entrance end of said recess and along said recess to divide said recess into two adjoining channels, the entrance section of said recess beyond said wall forming a reservoir for said channels.

6. A mold for welding two T-rails together as described in claim 4, said mold having discharge chamber means on the discharge side of said exit gate means, said entrance gate means and said exit gate means being relatively dimensioned to cause flow through said entrance gate means at a greater rate than discharge through said exit gate means.

7. A mold of the shell porous type for welding two metal parts together having a mold cavity for enclosing therein the end sections of said metal parts in aligned end to end relationship, said mold consisting of two similar sections having flat inner faces and adapted to be secured together in inner face to face relationship on opposite sides of the parts to be welded together while said parts are in aligned end to end relationship to define the side walls of said mold cavity, each of said sections having a conformation defining about half of said mold cavity, said mold having entrance gate means, exit gate means and discharge chamber means on the discharge side of said exit gate means, each of said sections having a hollow forming part of said discharge chamber means, and recess forming means at least part of which is on the inner face of one of said sections with the recess formed extending from the upper part of the hollow in the latter section to the end of the latter section and forming with the other section when the two sections are assembled a vent passage for venting the gas from the interior of said discharge chamber means as molten metal is discharged therein.

8. A mold of shell porous type for welding two metal parts together, said mold having a mold cavity and being made of two similar sections adapted to be secured together in inner face to face relationship on opposite sides of the metal parts to be welded together while said metal parts are in aligned end to end relationship to define the side walls of said mold cavity, said mold having entrance gate means, exit gate means and discharge chamber means on the discharge side of said exit gate means, each of said sections having a hollow forming part of said discharge means, each of said sections having a recess on its inner face extending from the upper part of said hollow to the end of the section, a recess extending across one end of said section and communicating with said face recess, and another recess extending across the other end of said section, the end recesses in the two sections being joined into communicating alignment when the two mold sections are assembled for welding, said recesses forming when the two sections are assembled passages for venting the gas from the discharge chamber means as molten metal is flowing therein.

References Cited by the Examiner

UNITED STATES PATENTS

| | | |
|---|---|---|
| 1,793,047 | 2/1931 | Brewitt. |
| 2,416,863 | 3/1947 | Begtrup. |
| 2,469,062 | 5/1949 | Begtrup. |
| 2,855,643 | 10/1958 | Anselmini et al. |
| 2,957,214 | 10/1960 | Kuharski _____ 22—203 |
| 3,004,310 | 10/1961 | Burke. |
| 3,007,217 | 11/1961 | Ahlert. |
| 3,091,825 | 1/1963 | Deppeler et al. |
| 3,103,721 | 9/1963 | Bishop et al. |

J. SPENCER OVERHOLSER, *Primary Examiner.*

MICHAEL V. BRINDISI, *Examiner.*

V. R. RISING, *Assistant Examiner.*